United States Patent
Choi et al.

(10) Patent No.: US 11,034,808 B2
(45) Date of Patent: Jun. 15, 2021

(54) POLYMER, METHOD FOR MANUFACTURING SAME, AND ELECTROLYTE MEMBRANE COMPRISING SAME

(71) Applicant: LG CHEM, LTD., Seoul (KR)

(72) Inventors: Hyungsam Choi, Daejeon (KR); Byungguk Kim, Daejeon (KR); Youngsik Eom, Daejeon (KR); Chong Kyu Shin, Daejeon (KR); Keun Won Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 259 days.

(21) Appl. No.: 15/532,297

(22) PCT Filed: Dec. 2, 2015

(86) PCT No.: PCT/KR2015/013093
§ 371 (c)(1),
(2) Date: Jun. 1, 2017

(87) PCT Pub. No.: WO2016/089123
PCT Pub. Date: Jun. 9, 2016

(65) Prior Publication Data
US 2017/0327655 A1    Nov. 16, 2017

(30) Foreign Application Priority Data
Dec. 2, 2014    (KR) .................. 10-2014-0170866

(51) Int. Cl.
*C08J 5/22* (2006.01)
*C08G 75/20* (2016.01)
(Continued)

(52) U.S. Cl.
CPC ............ *C08J 5/2256* (2013.01); *C08G 61/00* (2013.01); *C08G 75/00* (2013.01); *C08G 75/14* (2013.01);
(Continued)

(58) Field of Classification Search
CPC ........ C08J 5/2256; C08J 5/22; C08J 2381/06; C08J 5/2287; C08G 61/00; C08G 75/00;
(Continued)

(56) References Cited

U.S. PATENT DOCUMENTS

2006/0134423 A1   6/2006  Malet et al.
2006/0280988 A1*  12/2006 Chen .................. H01M 8/1039
                                                      429/483
(Continued)

FOREIGN PATENT DOCUMENTS

JP    2006-176665 A    7/2006
JP    2009-129703 A    6/2009
(Continued)

OTHER PUBLICATIONS

Wang et al. J. Power Sources 262 (2014) 328-337 (Year: 2014).*
(Continued)

*Primary Examiner* — Lisa S Park
(74) *Attorney, Agent, or Firm* — Birch, Stewart, Kolasch & Birch, LLP

(57) ABSTRACT

The present application relates to a polymer, a method for manufacturing the same, and an electrolyte membrane including the same.

15 Claims, 2 Drawing Sheets

(51) Int. Cl.
  *C08G 75/14* (2006.01)
  *H01M 2/16* (2006.01)
  *H01M 10/0565* (2010.01)
  *C08G 61/00* (2006.01)
  *C08L 81/00* (2006.01)
  *C08G 75/00* (2006.01)
  *C08L 65/00* (2006.01)
  *H01M 50/409* (2021.01)

(52) U.S. Cl.
  CPC ............... *C08G 75/20* (2013.01); *C08J 5/22* (2013.01); *C08L 65/00* (2013.01); *C08L 81/00* (2013.01); *H01M 10/0565* (2013.01); *H01M 50/409* (2021.01); *H01M 2300/00* (2013.01)

(58) Field of Classification Search
  CPC ......... C08G 75/14; C08G 75/20; C08L 81/00; C08L 65/00; H01M 2/16; H01M 10/0565; H01M 2300/00; H01M 2/1653
  See application file for complete search history.

(56) References Cited

U.S. PATENT DOCUMENTS

2009/0061277 A1* 3/2009 Sayre .................... C08J 5/2256
  429/402
2011/0166241 A1* 7/2011 Choi ................... H01M 8/1027
  521/27
2014/0363754 A1 12/2014 Choi et al.

FOREIGN PATENT DOCUMENTS

| KR | 10-2006-0067884 A | 6/2006 |
| KR | 10-2010-0050423 A | 5/2010 |
| KR | 10-2013-0105535 A | 9/2013 |

OTHER PUBLICATIONS

Matsumura, S., et al, "Ionomers for Proton Exchange Membrane Fuel Cells with Sulfonic Acid Groups on the End Groups: Novel Branced Poly(ether-ketone)s," Macromolecules, Dec. 28, 2007, vol. 41, pp. 281-284.
International Search Report (PCT/ISA/210) issued in PCT/KR2015/013093, dated Mar. 10, 2016.
Xie et al., "Synthesis and properties of highly branched star-shaped sulfonated block poly(arylene ether)s as proton exchange membranes", Journal of Membrane Science, vol. 473, 2015, pp. 226-236.
Xie et al., "Synthesis of highly branched sulfonated polymers and the effects of degree of branching on properties of branched sulfonated polymers as proton exchange membranes", Journal of Power Sources, vol. 262, 2014, pp. 328-337.

* cited by examiner

[Fig 1]
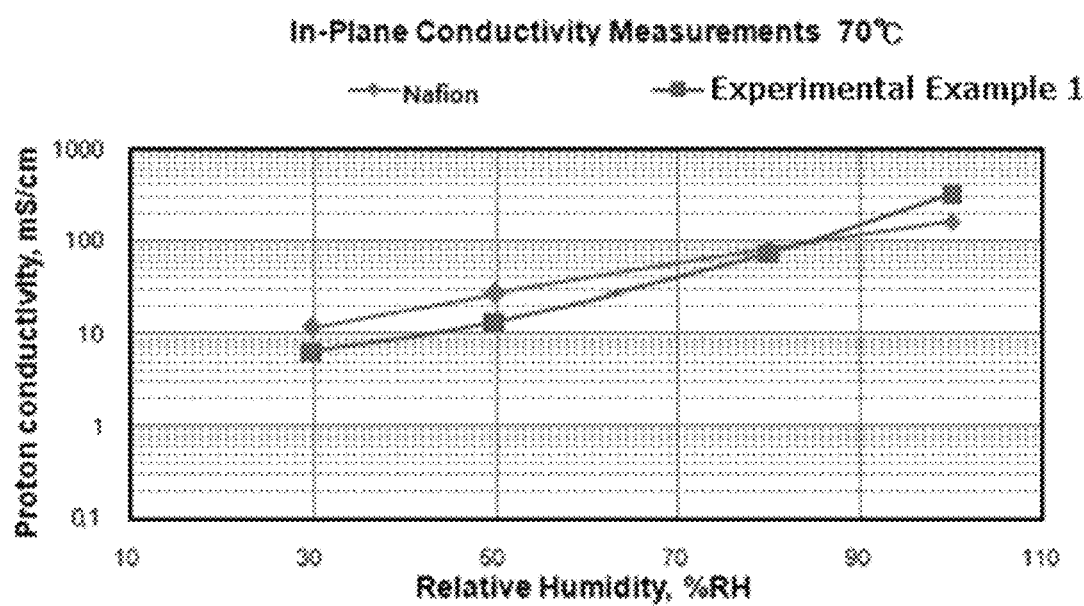

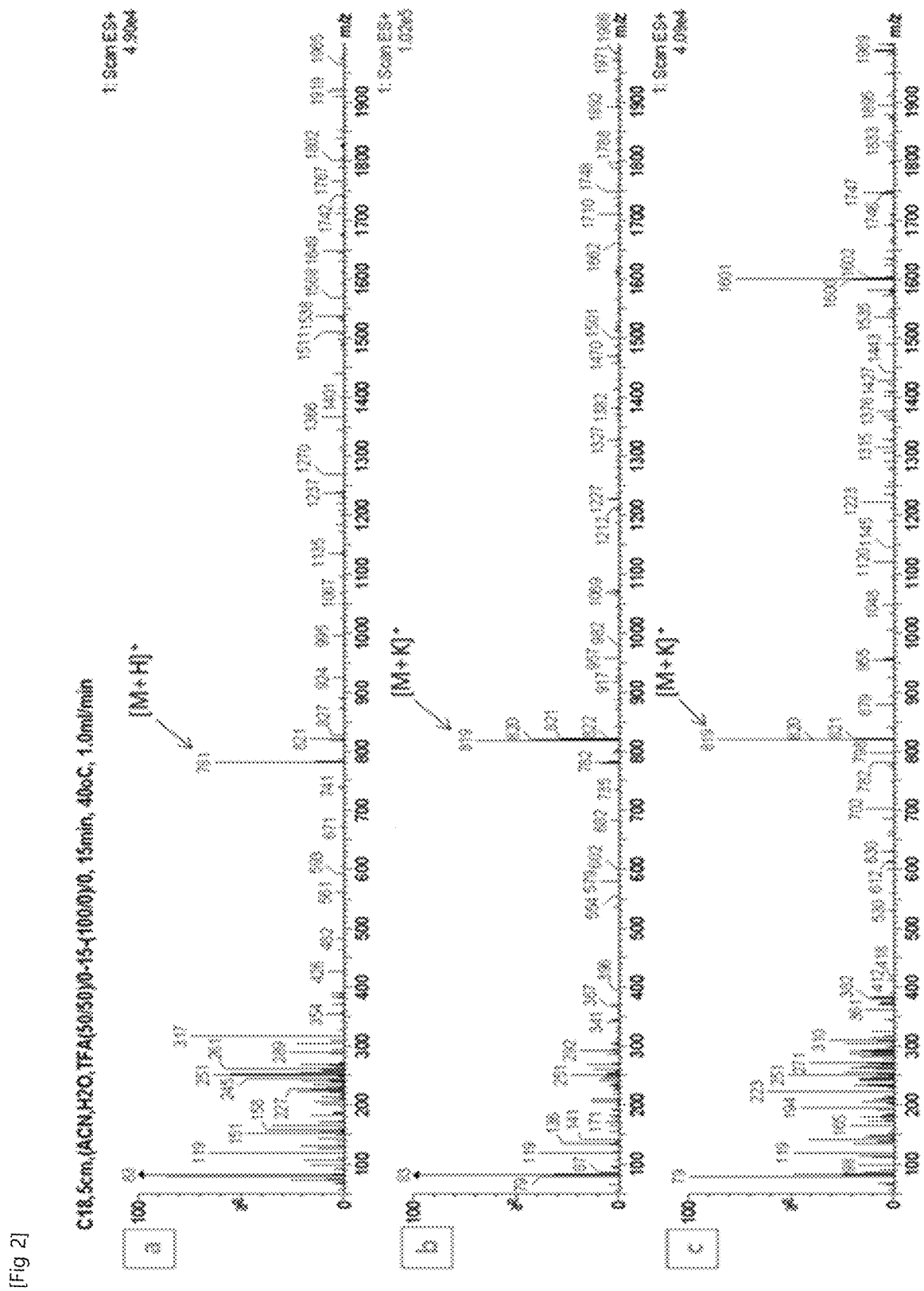
[Fig 2]

POLYMER, METHOD FOR MANUFACTURING SAME, AND ELECTROLYTE MEMBRANE COMPRISING SAME

TECHNICAL FIELD

The present specification claims priority to and the benefit of Korean Patent Application No. 10-2014-0170866 filed in the Korean Intellectual Property Office on Dec. 2, 2014, the entire contents of which are incorporated herein by reference.

The present application relates to a polymer, a method for manufacturing the same, and an electrolyte membrane including the same.

BACKGROUND ART

Recently, various materials have been developed in abundance in various technical fields. Further, raw materials used for the development of various materials have also been developed together. For example, in the case of a polymer material, a polymer having a desired physical property itself has been developed by adjusting a polymerization method using publicly known monomers, a combination, a composition ratio or a distribution state of monomers in a polymer, a 3D structure of a polymer, a length or a type of a side chain, and the like. Further, novel monomers and branchers used for polymerizing a polymer have also been developed together.

CITATION LIST

Official Gazette of Korean Patent Application Laid-Open No. 10-2006-0067884

DETAILED DESCRIPTION OF THE INVENTION

Technical Problem

The present application has been made in an effort to provide a polymer, a method for manufacturing the same, and an electrolyte membrane including the same.

Technical Solution

An exemplary embodiment of the present application provides a polymer including: a brancher represented by the following Chemical Formula 1; and a repeating unit represented by the following Chemical Formula A.

[Chemical Formula 1]

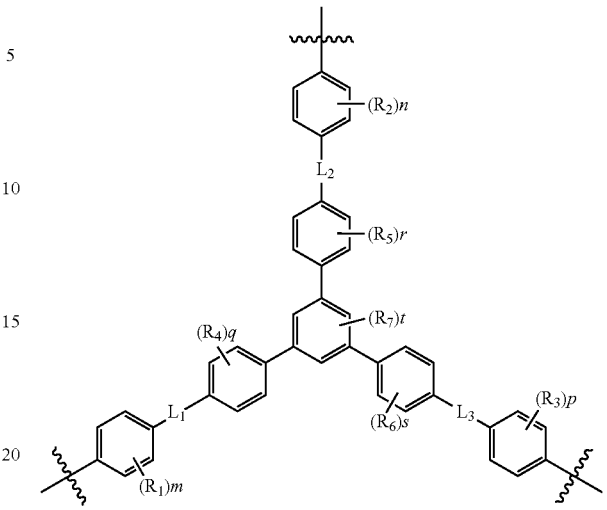

In Chemical Formula 1, $L_1$ to $L_3$ are the same as or different from each other, and are each independently a direct bond, $-SO_2-$, $-CO-$, or $-S-$, $R_1$ to $R_7$ are the same as or different from each other, and are each independently any one selected from hydrogen; deuterium; a halogen group; a nitrile group; a nitro group; a hydroxy group; a cyano group; a $C_1$ to $C_{60}$ straight or branched alkyl; a $C_2$ to $C_{60}$ straight or branched alkenyl; a $C_2$ to $C_{60}$ straight or branched alkynyl; a $C_3$ to $C_{60}$ monocyclic or polycyclic cycloalkyl; a $C_2$ to $C_{60}$ monocyclic or polycyclic heterocycloalkyl; a $C_6$ to $C_{60}$ monocyclic or polycyclic aryl; a $C_2$ to $C_{60}$ monocyclic or polycyclic heteroaryl; and an amine group, and the substituents may be unsubstituted or substituted with halogen, m, n, p, q, r, and s are the same as or different from each other, and are each independently an integer from 0 to 4, t is an integer from 0 to 3, when m, n, p, q, r, s, and t are each an integer of 2 or more, a plurality of $R_1$ to $R_7$ are the same as or different from each other,

[Chemical Formula A]

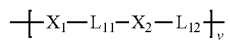

in Chemical Formula A, v means the number of repeating units, and is an integer from 1 to 1,000, $L_{11}$ and $L_{12}$ are the same as or different from each other, and are each independently $-S-$ or $-SO_2-$, $X_1$ and $X_2$ are the same as or different from each other, and are each independently represented by any one of the following Chemical Formulae 2 to 4,

[Chemical Formula 2]

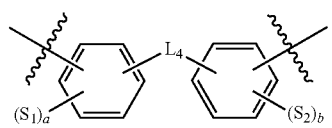

[Chemical Formula 3]

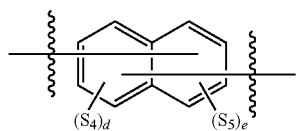

[Chemical Formula 4]

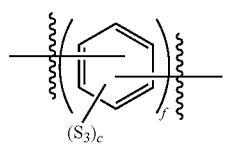

in Chemical Formulae 2 to 4, $L_4$ is any one selected from a direct bond, —$CZ_2Z_3$—, —CO—, —O—, —S—, —$SO_2$—, —$SiZ_2Z_3$—, and a substituted or unsubstituted divalent fluorene group, $Z_2$ and $Z_3$ are the same as or different from each other, and are each independently any one selected from hydrogen, an alkyl group, a trifluoromethyl group (—$CF_3$), and a phenyl group, $S_1$ to $S_5$ are the same as or different from each other, and are each independently any one selected from hydrogen; deuterium; a halogen group; a cyano group; a nitrile group; a nitro group; a hydroxy group; a substituted or unsubstituted alkyl group; a substituted or unsubstituted heterocycloalkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; a substituted or unsubstituted heteroaryl group; —$SO_3H$; —$SOO_3^-$ $M^+$; —COOH; —$COO^-M^+$; —$PO_3H_2$; —$PO_3H^-M^+$; and —$PO_3^{2-}2M^+$, and M is a Group 1 element, a to e are the same as or different from each other, and are each independently an integer of 0 or more and 4 or less, and f is an integer of 1 or more and 5 or less.

An exemplary embodiment of the present application provides an electrolyte membrane including the polymer.

An exemplary embodiment of the present application provides a battery including the electrolyte membrane.

An exemplary embodiment of the present application provides a method for manufacturing a polymer, the method including:

a) manufacturing a brancher represented by the following Chemical Formula 1-A by reacting 1,3,5-triphenylbenzene and a dihalogen-based phenyl; and b) manufacturing a polymer by polymerizing the brancher and at least one of monomers represented by the following Chemical Formulae 2-A to 4-A.

[Chemical Formula 1-A]

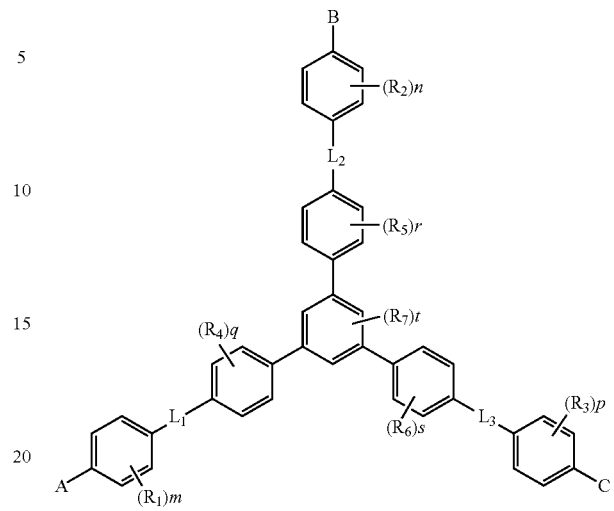

In Chemical Formula 1-A,

A to C are each a halogen group, $L_1$ to $L_3$ are the same as or different from each other, and are each independently a direct bond, —$SO_2$—, —CO—, or —S—, $R_1$ to $R_7$ are the same as or different from each other, and are each independently any one selected from hydrogen; deuterium; a halogen group; a nitrile group; a nitro group; a hydroxy group; a cyano group; a $C_1$ to $C_{60}$ straight or branched alkyl; a $C_2$ to $C_{60}$ straight or branched alkenyl; a $C_2$ to $C_{60}$ straight or branched alkynyl; a $C_3$ to $C_{60}$ monocyclic or polycyclic cycloalkyl; a $C_2$ to $C_{60}$ monocyclic or polycyclic heterocycloalkyl; a $C_6$ to $C_{60}$ monocyclic or polycyclic aryl; a $C_2$ to $C_{60}$ monocyclic or polycyclic heteroaryl; and an amine group, and the substituents may be unsubstituted or substituted with halogen, m, n, p, q, r, and s are the same as or different from each other, and are each independently an integer from 0 to 4, t is an integer from 0 to 3, when m, n, p, q, r, s, and t are each an integer of 2 or more, a plurality of $R_1$ to $R_7$ are the same as or different from each other,

[Chemical Formula 2-A]

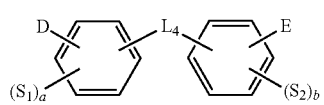

[Chemical Formula 3-A]

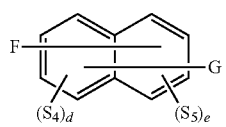

[Chemical Formula 4-A]

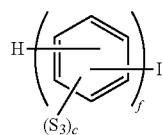

in Chemical Formulae 2-A to 4-A,

D to I are —SH, $L_4$ is any one selected from a direct bond, —$CZ_2Z_3$—, —CO—, —O—, —S—, —$SO_2$—, —$SiZ_2Z_3$—, and a substituted or unsubstituted divalent fluorene group, $Z_2$ and $Z_3$ are the same as or different from each other, and are each independently any one selected from hydrogen, an alkyl group, a trifluoromethyl group (—$CF_3$), and a phenyl group, $S_1$ to $S_5$ are the same as or different from each other, and are each independently any one selected from hydrogen; deuterium; a halogen group; a cyano group; a nitrile group; a nitro group; a hydroxy group; a substituted or unsubstituted alkyl group; a substituted or unsubstituted heterocycloalkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; a substituted or unsubstituted heteroaryl group; —$SO_3H$; —$SOO_3^- M^+$; —COOH; —$COO^-M^+$; —$PO_3H_2$; —$PO_3H^-M^+$; and —$PO_3^{2-}2M^+$, and M is a Group 1 element, a to e are the same as or different from each other, and are each independently an integer of 0 or more and 4 or less, and 0≤d+e≤6, and f is an integer of 1 or more and 5 or less.

An exemplary embodiment of the present application provides a method for manufacturing an electrolyte membrane, the method including: manufacturing a polymer according to the method for manufacturing a polymer; and forming a membrane by using the manufactured polymer.

Advantageous Effects

A polymer according to an exemplary embodiment of the present application is novel, and is highly available as various materials or a raw material thereof.

The polymer according to an exemplary embodiment of the present application is highly active by including a brancher having a plurality of active regions, and has an effect in that physical properties and chemical resistance characteristics are excellent by a —S— or —$SO_2$— linking group.

An electrolyte membrane including the polymer according to an exemplary embodiment of the present application has an effect in that mechanical properties and chemical characteristics of the membrane are excellent, and the ion conductivity is high even under high humidity conditions.

BRIEF DESCRIPTION OF DRAWINGS

FIG. 1 is a graph obtained by measuring the hydrogen ion conductivities of a polymer electrolyte membrane manufactured in Preparation Example 3 of the present application and a Nafion membrane.

FIG. 2 is mass data illustrating the synthesis confirmation result of a brancher manufactured in Preparation Example 1 of the present application.

BEST MODE

Hereinafter, the present specification will be described in more detail.

An exemplary embodiment of the present application provides a polymer including: the brancher represented by Chemical Formula 1; and the repeating unit represented by Chemical Formula A.

In the present specification, the brancher serves to link or crosslink chains in a polymer. Depending on a structure of a brancher or the number of branchers, a branch may be formed on a polymer chain, or chains may be cross-linked to each other to form a network-type structure.

According to an exemplary embodiment of the present application, the brancher is a trivalent organic group, and may be bonded to additional units in three directions to elongate a polymer chain.

The polymer according to an exemplary embodiment of the present application is highly active by including a brancher having a plurality of active regions as a core structure itself, and may exhibit an effect in that physical properties and chemical resistance characteristics are excellent according to the type of linking group of the brancher.

A direct bond, —$SO_2$—, —CO—, or —S— may be introduced into $L_1$ to $L_3$, which are a linker of the brancher according to an exemplary embodiment of the present application. The mechanical properties and chemical resistance of the polymer may become excellent by having the linker. For example, when —O— is introduced into the linker, an acid group may be displayed by the following mechanism, and due to the acid group, chemical resistance characteristics may deteriorate because the reactivity is increased.

[Reaction Formula 1]

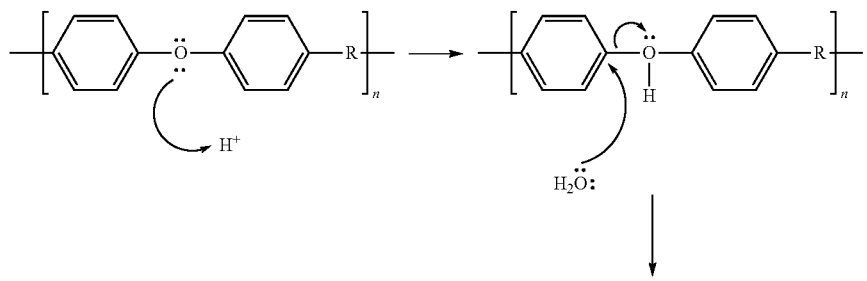

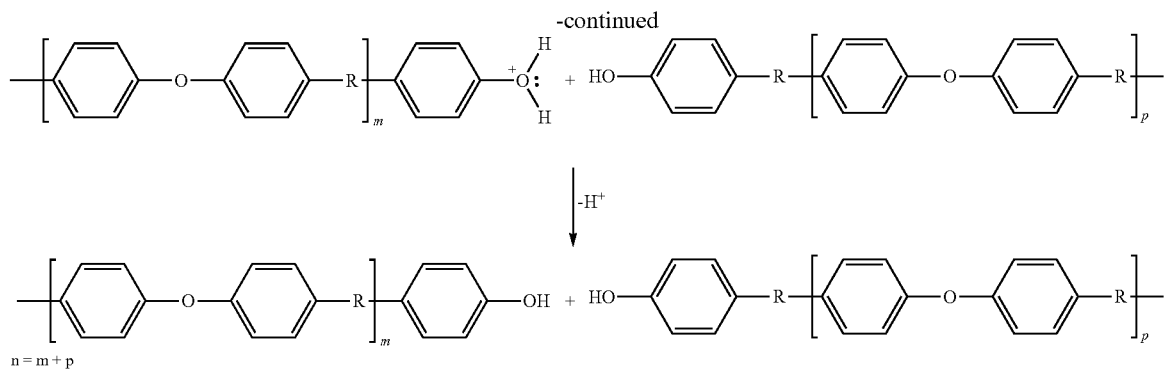

n = m + p

In Reaction Formula 1, R is the same as the definitions of $R_1$ to $R_7$ of Chemical Formula 1, and n, m, and p are the same as the definitions in Chemical Formula 1.

In the present specification,

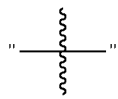

represents a position which may be bonded to an adjacent substituent.

According to an exemplary embodiment of the present application, a capping group at the end of the brancher may be a halogen group, —OH, —SH, and the like. The capping group may mean a substituent which is linked to

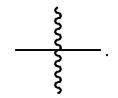

According to an exemplary embodiment of the present application, when a brancher and two or more units, which form a polymer, are bonded to each other, the branchers and the units may each have a linking group of sulfur (—S—) or sulfonyl (—SO$_2$—). For example, the sulfur linking group is a linking group remaining in the chain, from which the compound is left by condensation polymerization. For example, when a dihalogen-based monomer and a dithiol-based monomer are polymerized, the sulfur linking group may be a case where HF evades and only sulfur (—S—) remains in the chain. Further, the sulfonyl (—SO$_2$—) linking group may be, for example, in the form where the sulfur (—S—) linking group is oxidized. The sulfur (—S—) or sulfonyl (—SO$_2$—) linking group is not easily decomposed as compared to the oxygen (—O—) linking group in the related art, and thus has an effect in that the chemical stability is excellent.

Examples of the substituents will be described below, but are not limited thereto.

In the present specification, examples of the halogen group include fluorine, chlorine, bromine or iodine.

In the present specification, the alkyl group may be straight or branched, and the number of carbon atoms thereof is not particularly limited, but it is preferred that the number is 1 to 60, specifically 1 to 40, and more specifically 1 to 20. Specific examples thereof include a methyl group, an ethyl group, a propyl group, an isopropyl group, a butyl group, a t-butyl group, a pentyl group, a hexyl group, a heptyl group, and the like, but are not limited thereto.

In the present specification, the alkenyl group may be straight or branched, and the number of carbon atoms thereof is not particularly limited, but it is preferred that the number is 2 to 60, specifically 2 to 40, and more specifically 2 to 20.

In the present specification, the alkoxy group may be straight or branched, and the number of carbon atoms thereof is not particularly limited, but it is preferred that the number is 1 to 60, specifically 1 to 40, and more specifically 1 to 20.

In the present specification, the cycloalkyl group is not particularly limited, but it is preferred that the number of carbon atoms thereof is 3 to 60, specifically 3 to 40, and more specifically 5 to 20, and particularly, a cyclopentyl group and a cyclohexyl group are preferred.

In the present specification, the heterocycloalkyl group includes one or more of S, O, and N and is not particularly limited, but it is preferred that the number of carbon atoms thereof is 2 to 60, specifically 2 to 40, and more specifically 3 to 20.

In the present specification, the number of carbon atoms of the amine group is not particularly limited, but it is preferred that the number is 1 to 60, specifically 1 to 40, and more specifically 1 to 20. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a phenylnaphthylamine group, a ditolylamine group, a phenyltolylamine group, a triphenylamine group, and the like, but are not limited thereto.

In the present specification, the aryl group may be monocyclic or polycyclic, and the number of carbon atoms thereof is not particularly limited, but it is preferred that the number is 6 to 60, specifically 6 to 40, and more specifically 6 to 20. Specific examples of the aryl group include a polycyclic aromatic group, such as a phenyl group, a biphenyl group, a terphenyl group, a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylene group, and a fluoranthene group, and the like, but are not limited thereto.

In the present specification, the heteroaryl group includes one or more of S, O, and N as a heteroatom, and the number of carbon atoms thereof is not particularly limited, but it is preferred that the number is 2 to 60, specifically 2 to 40, and more specifically 3 to 20. Specific examples of the heteroaryl group include pyridyl, pyrrolyl, pyrimidyl, pyridazinyl, furanyl, thienyl, imidazolyl, pyrazolyl, oxazolyl, isoxazolyl, thiazolyl, isothiazolyl, triazolyl, furazanyl, oxadiazolyl, thiadiazolyl, dithiazolyl, tetrazolyl, pyranyl, thiopyranyl, diazinyl, oxazinyl, thiazinyl, dioxynyl, triazinyl, tetrazinyl, quinolyl, isoquinolyl, quinazolinyl, isoquinazolinyl, acridinyl, phenanthridinyl, imidazopyridinyl, diazanaphthalenyl, triazaindene, indolyl, benzothiazolyl, benzoxazolyl, benzoimidazolyl, a benzothiophene group, a benzofuran group, a dibenzothiophene group, a dibenzofuran group, carbazolyl, benzocarbazolyl, phenazinyl, and the like, or fused rings thereof, but are not limited thereto.

In the present specification, the term "substituted or unsubstituted" means being unsubstituted or substituted with one or more substituents selected from a group consisting of deuterium; a halogen group; a nitrile group; a nitro group; a hydroxy group; a cyano group; $C_1$ to $C_{60}$ straight or branched alkyl; $C_2$ to $C_{60}$ straight or branched alkenyl; $C_2$ to $C_{60}$ straight or branched alkynyl; $C_3$ to $C_{60}$ monocyclic or polycyclic cycloalkyl; $C_2$ to $C_{60}$ monocyclic or polycyclic heterocycloalkyl; $C_6$ to $C_{60}$ monocyclic or polycyclic aryl; and $C_2$ to $C_{60}$ monocyclic or polycyclic heteroaryl, or being unsubstituted or substituted with a substituent having a structure in which two or more selected from a group consisting of the substituents above exemplified are linked. As described above, when the substituent has a structure in which two or more substituents are linked, the two or more substituents may be the same as or different from each other.

According to an exemplary embodiment of the present application, $L_{11}$ and $L_{12}$ in Chemical Formula A are the same as each other.

According to an exemplary embodiment of the present application, $L_{11}$ and $L_{12}$ in Chemical Formula A are —S—.

According to an exemplary embodiment of the present application, $L_{11}$ and $L_{12}$ in Chemical Formula A are —$SO_2$—.

According to an exemplary embodiment of the present application, at least one of $L_{11}$ and $L_{12}$ in Chemical Formula A is —$SO_2$—.

According to an exemplary embodiment of the present application, in Chemical Formula A, v is an integer of 2 or more, and at least one of a plurality of $L_{11}$ and $L_{12}$ is —$SO_2$—.

When at least one of the linking groups $L_{11}$ and $L_{12}$ in the polymer includes —$SO_2$—, it is possible to exhibit an effect in that the linking groups are not easily decomposed and the chemical stability is excellent as compared to the case where both $L_{11}$ and $L_{12}$ include only —S— or —O—. Furthermore, when both the linking groups $L_{11}$ and $L_{12}$ in the polymer are —$SO_2$—, the chemical stability may be further enhanced. Accordingly, since the polymer according to the exemplary embodiment has a small change in molecular weight, an electrolyte membrane including the polymer may exhibit an effect in that the durability is excellent.

According to an exemplary embodiment of the present application, $R_1$ to $R_7$ are the same as or different from each other, and are each independently any one selected from hydrogen; deuterium; a halogen group; a $C_1$ to $C_{10}$ alkyl group; and —$(CF_2)uCF_3$, and u may be an integer from 0 to 5.

According to an exemplary embodiment of the present application, m, n, and p are the same as or different from each other, and may be each independently 0 or 1.

According to an exemplary embodiment of the present application, m, n, and p are the same as or different from each other, and may be each independently 0 or 1, and when m, n, and p are each 1, in the benzene ring, $R_1$ to $R_3$ may be each substituted at the linking group

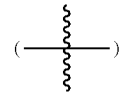

at the ends thereof and the ortho, meta, and para positions.

According to an exemplary embodiment of the present application, when m, n, and p are each 1, in the benzene ring, $R_1$ to $R_3$ may be each substituted at the linking group

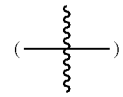

at the ends thereof and the ortho position.

According to an exemplary embodiment of the present application, $R_1$ to $R_3$ are the same as or different from each other, and are each independently any one selected from hydrogen; deuterium; a halogen group; a $C_1$ to $C_{10}$ alkyl group; and —$(CF_2)uCF_3$, and u may be an integer from 0 to 5.

According to an exemplary embodiment of the present application, $R_1$ to $R_3$ are the same as or different from each other, and are each independently any one selected from hydrogen; a halogen group; a $C_1$ to $C_{10}$ alkyl group; and —$(CF_2)uCF_3$, and u may be an integer from 0 to 5.

According to an exemplary embodiment of the present application, at least one of $R_1$ to $R_3$ is any one selected from a halogen group; a $C_1$ to $C_{10}$ alkyl group; and —$(CF_2)uCF_3$, and u may be an integer from 0 to 5. When the benzene ring includes a substituent capable of activating an end group (may be represented by a leaving group or a capping group) of a brancher, particularly, fluoroalkyl, it is possible to exhibit an effect in that the polymerization becomes advantageous by increasing the reactivity.

According to an exemplary embodiment of the present application, at least one of $R_1$ to $R_3$ is any one selected from halogen or —$(CF_2)uCF_3$, and u may be an integer from 0 to 2.

According to an exemplary embodiment of the present application, $R_1$ to $R_3$ may be —$(CF_2)uCF_3$, and u may be 0 or 1.

According to an exemplary embodiment of the present application, q, r, s, and t may be 0.

According to an exemplary embodiment of the present application, $R_4$ to $R_7$ may be hydrogen.

According to an exemplary embodiment of the present application, $L_1$ to $L_3$ are the same as or different from each other, and may be each independently —S— or —$SO_2$—.

According to an exemplary embodiment of the present application, $L_1$ to $L_3$ may be —$SO_2$—.

In this case, the polymer includes a brancher containing a sulfone group, and thus may effectively exhibit characteristics of the polymer without any deterioration in physical properties according to the increase in a sulfone group. The sulfone group of the brancher serves to activate a leaving group at the ends thereof, and thus may serve to strengthen mechanical properties because a material having a high molecular weight can be synthesized when the sulfone group is applied to the brancher. Further, it is possible to exhibit an effect in that chemical resistance characteristics are excellent by including a sulfone structure in a polymer.

According to an exemplary embodiment of the present application, the polymer may be a copolymer, and the copolymer may include a structure such as an alternating copolymer, a block copolymer, a random copolymer, and a graft copolymer. For example, the polymer according to an exemplary embodiment of the present application may be a copolymerized structure by further including a repeating unit other than the repeating unit of Chemical Formula A.

According to an exemplary embodiment of the present application, the repeating unit represented by Chemical Formulae 2 to 4 may be any one selected from the following structural formulae.

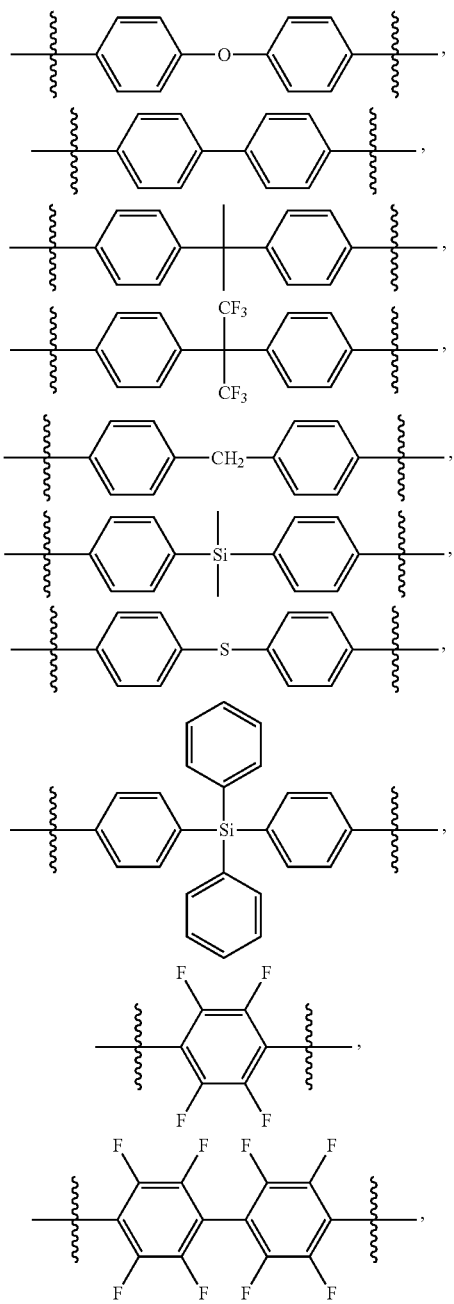

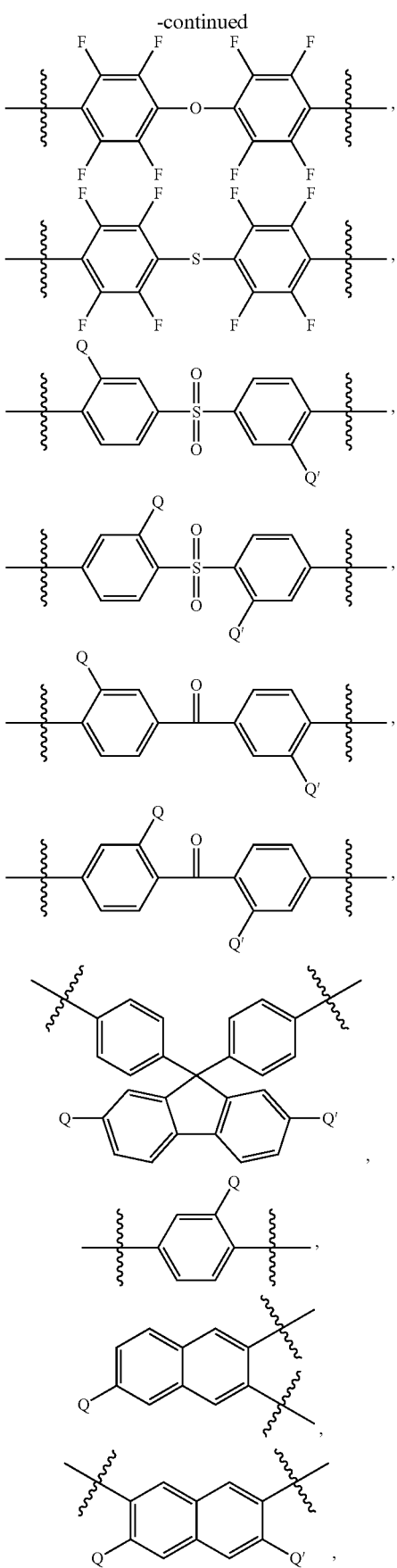

-continued

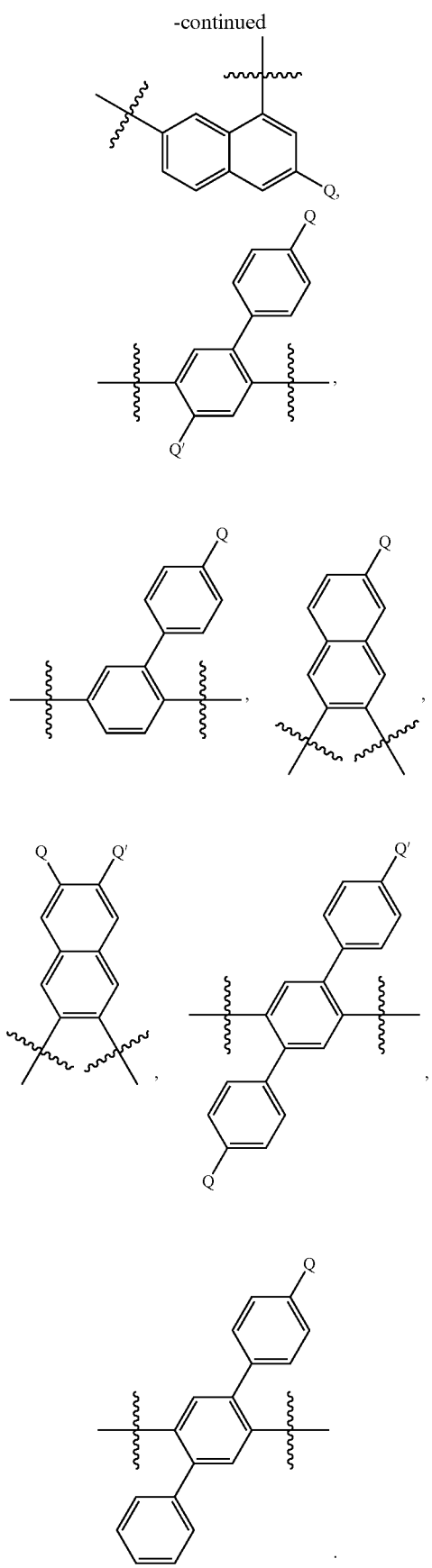

Here, Q and Q' are the same as or different from each other, and may be each independently selected from hydrogen; —SO$_3$H; —SOO$_3^-$M$^+$; —COOH; —COO$^-$M$^+$; —PO$_3$H$_2$; —PO$_3$H$^-$M$^+$; and —PO$_3{}^{2-}$2M$^+$, and M may be sodium, potassium, or lithium.

According to an exemplary embodiment of the present application, the brancher represented by Chemical Formula 1 may be any one selected among the following structural formulae, and each weight average molecular weight is as follows.

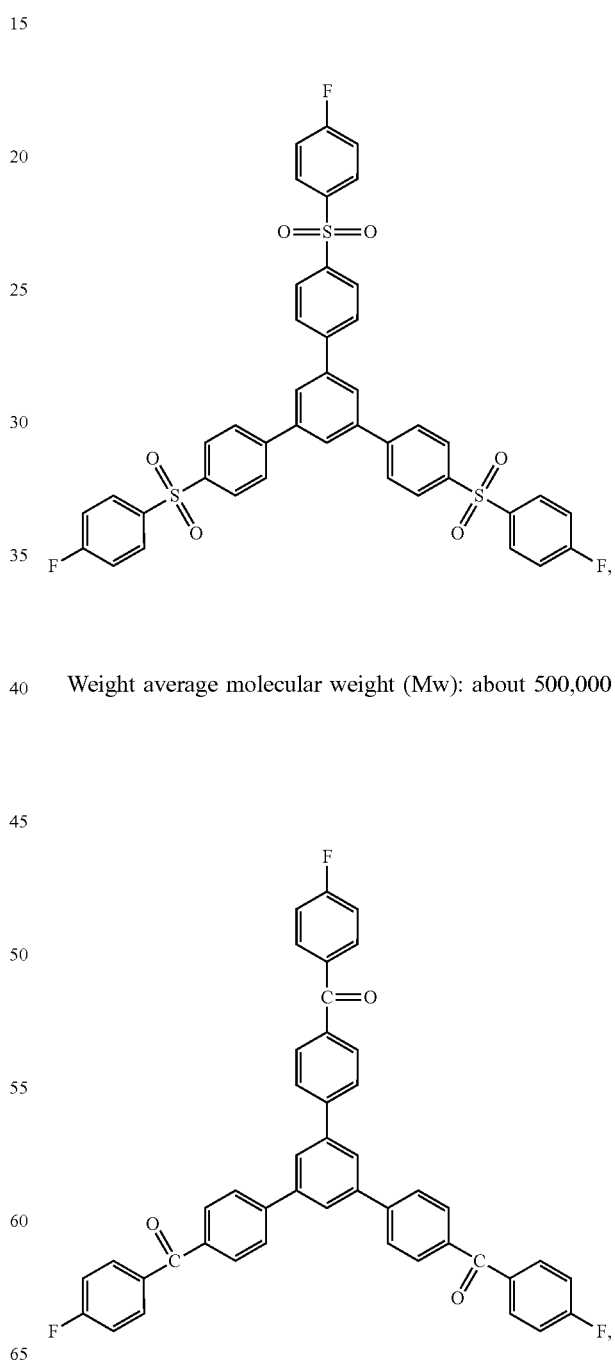

Weight average molecular weight (Mw): about 500,000

Weight average molecular weight (Mw): about 200,000

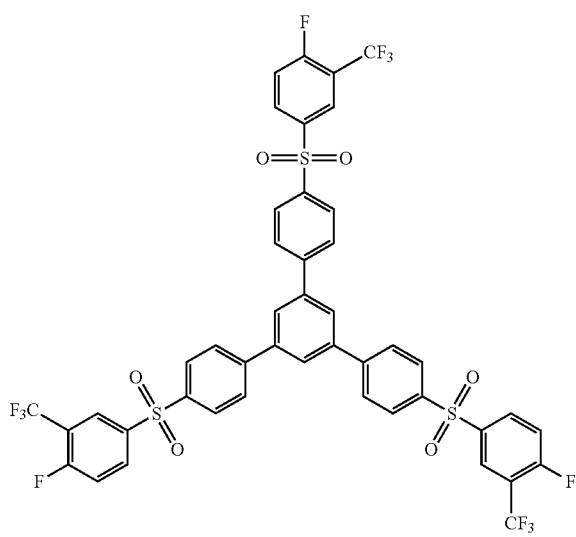

Weight average molecular weight (Mw): about 700,000 to 800,000

As shown above, as a highly reactive brancher is used, it is possible to manufacture a film having a high molecular weight and strong mechanical properties.

According to an exemplary embodiment of the present application, the content of the brancher represented by Chemical Formula 1 may be 0.5 to 50 wt %, specifically 1 to 10 wt % based on the polymer solid content. When the content of the brancher is within the range, the molecular weight may be increased, and mechanical properties may be strengthened by forming a network structure of a polymer.

According to an exemplary embodiment of the present application, the polymer may have a weight average molecular weight of 5,000 or more and 5,000,000 or less, specifically, 50,000 or more and 1,000,000 or less. When the weight average molecular weight of the polymer is within the range, mechanical properties of the material including the polymer do not deteriorate, and an appropriate solubility of the polymer may be maintained.

Further, an exemplary embodiment of the present application provides an electrolyte membrane including the polymer.

According to an exemplary embodiment of the present application, the electrolyte membrane has a thickness of preferably 5 to 200 µm, and more preferably 10 to 100 µm. When the electrolyte membrane has a thickness within the range, the electrolyte membrane may reduce the electric short and the crossover of the electrolyte material, and may exhibit excellent cation conductivity characteristics.

Further, an exemplary embodiment of the present application provides a battery including the electrolyte membrane.

The battery may be a fuel cell or a redox flow battery.

Further, an exemplary embodiment of the present application provides a fuel cell including the electrolyte membrane.

A fuel cell is an energy conversion device that converts chemical energy of a fuel directly into electrical energy. That is, the fuel cell uses a fuel gas and an oxidizing agent, and adopts a method of producing electric power by using the electrons generated during the redox reaction of the fuel gas and the oxidizing agent.

A membrane electrode assembly (MEA) of the fuel cell is a part in which an electrochemical reaction of hydrogen and oxygen occurs, and includes a cathode, an anode, and an electrolyte membrane, that is, an ion conductive electrolyte membrane.

When the electrolyte membrane according to the present invention is used as an ion exchange membrane of a fuel cell, the above-described effect may be exhibited.

Further, an exemplary embodiment of the present application provides a redox flow battery including the electrolyte membrane.

A redox flow battery (oxidation-reduction flow battery) is a system in which an active material included in an electrolytic solution is oxidized and reduced and thus the battery is charged and discharged, and the redox flow battery is an electrochemical power storage device that stores chemical energy of the active material directly into electrical energy. The redox flow battery uses a principle in which when electrolytic solutions including active materials having different oxidation states meet each other with an ion exchange membrane interposed therebetween, electrons are given and received, and thus the battery is charged and discharged. In general, the redox flow battery is composed of a tank containing an electrolytic solution, a battery cell in which the charge and discharge occur, and a circulation pump for circulating the electrolytic solution between the tank and the battery cell, and the unit cell of the battery cell includes an electrode, an electrolyte, and an ion exchange membrane.

When the electrolyte membrane according to the present application is used as an ion exchange membrane of a redox flow battery, the above-described effect may be exhibited.

Further, an exemplary embodiment of the present application provides a method for manufacturing a polymer, the method including:

a) manufacturing a brancher represented by the following Chemical Formula 1-A by reacting 1,3,5-triphenylbenzene and a dihalogen-based phenyl; and b) manufacturing a polymer by polymerizing the brancher and at least one of monomers represented by the following Chemical Formulae 2-A to 4-A.

[Chemical Formula 1-A]

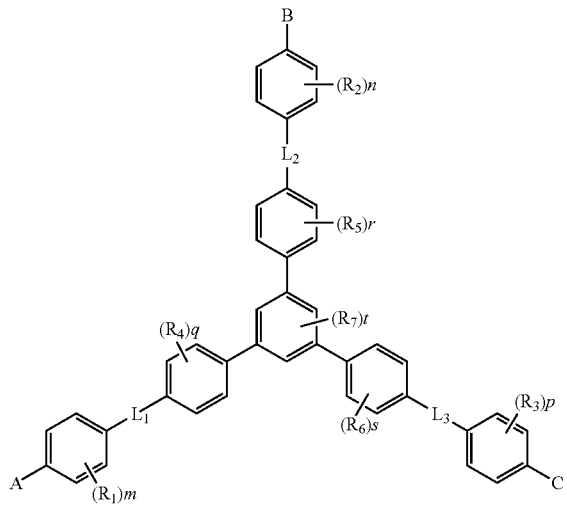

In Chemical Formula 1-A,

A to C are each a halogen group, $L_1$ to $L_3$ are the same as or different from each other, and are each independently a direct bond, —$SO_2$—, —CO—, —O—, or —S—, $R_1$ to $R_7$ are the same as or different from each other, and are each independently any one selected from hydrogen; deuterium; a halogen group; a nitrile group; a nitro group; a hydroxy group; a cyano group; a $C_1$ to $C_{60}$ straight or branched alkyl; a $C_2$ to $C_{60}$ straight or branched alkenyl; a $C_2$ to $C_{60}$ straight or branched alkynyl; a $C_3$ to $C_{60}$ monocyclic or polycyclic cycloalkyl; a $C_2$ to $C_{60}$ monocyclic or polycyclic heterocycloalkyl; a $C_6$ to $C_{60}$ monocyclic or polycyclic aryl; a $C_2$ to $C_{60}$ monocyclic or polycyclic heteroaryl; and an amine group, and the substituents may be unsubstituted or substituted with halogen, m, n, p, q, r, and s are the same as or different from each other, and are each independently an integer from 0 to 4, t is an integer from 0 to 3, when m, n, p, q, r, s, and t are each an integer of 2 or more, a plurality of $R_1$ to $R_7$ are the same as or different from each other,

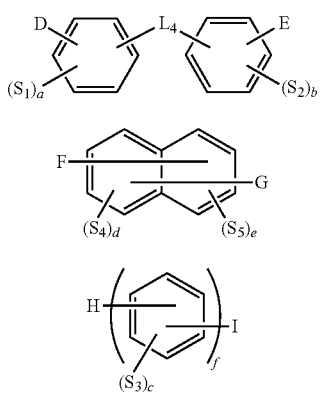

[Chemical Formula 2-A]

[Chemical Formula 3-A]

[Chemical Formula 4-A]

in Chemical Formulae 2-A to 4-A,

D to I are —SH, $L_4$ is any one selected from a direct bond, —$CZ_2Z_3$—, —CO—, —O—, —S—, —$SO_2$—, —$SiZ_2Z_3$—, and a substituted or unsubstituted divalent fluorene group, $Z_2$ and $Z_3$ are the same as or different from each other, and are each independently any one selected from hydrogen, an alkyl group, a trifluoromethyl group (—$CF_3$), and a phenyl group, $S_1$ to $S_5$ are the same as or different from each other, and are each independently any one selected from hydrogen; deuterium; a halogen group; a cyano group; a nitrile group; a nitro group; a hydroxy group; a substituted or unsubstituted alkyl group; a substituted or unsubstituted heterocycloalkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; a substituted or unsubstituted heteroaryl group; —$SO_3H$; —$SOO_3^- M^+$; —COOH; —$COO^-M^+$; —$PO_3H_2$; —$PO_3H^-M^+$; and —$PO_3^{2-}2M^+$, and M is a Group 1 element, a to e are the same as or different from each other, and are each independently an integer of 0 or more and 4 or less, and $0 \leq d+e \leq 6$, and f is an integer of 1 or more and 5 or less.

The definition of Chemical Formula 1-A may be the same as the above-described definition of Chemical Formula 1, except for A to C.

The definitions of Chemical Formulae 2-A to 4-A may be the same as the above-described definitions of Chemical Formulae 2 to 4, except for D to I.

According to an exemplary embodiment of the present application, in the method for manufacturing a polymer, the polymer include an —S— linking group, and the method may further include oxidizing at least a portion of the —S— linking group in the polymer by —$SO_2$—. Here, the —S— linking group means a linking group of —S— formed while H is detached from an —SH group, which is D to I in Chemical Formulae 2-A to 4-A, during the polymerization process. That is, the —S— linking group may mean an —S— linking group of a polymer chain formed by an —SH group which is an end group of a monomer represented by any one of Chemical Formulae 2-A to 4-A from the condensation polymerization of the monomer represented by any one of Chemical Formulae 2-A to 4-A with another monomer or a brancher.

The case where a linking group —$SO_2$— is included in the polymer may exhibit an effect in that the linking group is not easily decomposed and the chemical stability is excellent, as compared to the case where only —S— or —O— is included in the polymer, and furthermore, the case where all the linking groups in the polymer are —$SO_2$— may further enhance the chemical stability. Further, accordingly, since the polymer has a small change in molecular weight, an electrolyte membrane including the polymer may exhibit an effect in that the durability is excellent.

According to an exemplary embodiment of the present application, the oxidation may be carried out by using an oxidizing solution. The oxidizing solution may strengthen the chemical durability by changing the linking group —S— of the polymer skeleton into —$SO_2$—.

According to an exemplary embodiment of the present application, the oxidizing solution may include an acid and hydrogen peroxide. When the oxidizing solution is used, there is an advantage in that a separate acid treatment process is not needed because oxidation and an acid treatment are simultaneously carried out.

The acid may be acetic acid, sulfuric acid, formic acid, and the like, but is not limited thereto.

An exemplary embodiment of the present application provides a method for manufacturing an electrolyte membrane, the method including: manufacturing a polymer according to the method for manufacturing a polymer; and forming a membrane by using the manufactured polymer.

According to an exemplary embodiment of the present application, the method may include oxidizing at least a portion of an —S— linking group in the polymer by —$SO_2$— before or after the forming of the membrane.

The oxidation is the same as that as described above.

MODE FOR INVENTION

Hereinafter, the present application will be described in more detail through Examples. However, the following Examples are provided for exemplifying the present application, and the scope of the present application is not limited thereby.

<Preparation Example 1> Manufacture of Brancher 1,3,5-triphenylbenzene (1.5 g, 4.895 mmol) and 4-fluorobenzenesulfonyl chloride (6.7 g, 34.428 mmol) were introduced into a 25 ml 3-neck round bottom flask, and then inert conditions were created by flowing nitrogen. After the temperature was increased to 100° C., nitrobenzene was added thereto, and subsequently, FeCl$_3$ was slowly added thereto, and the resulting mixture was stirred for 3 hours. After the mixture was cooled to room temperature, the mixture was poured into a mixed solution of methanol/HCl (50 ml/3 ml), and the precipitate was washed with water and dried, thereby obtaining a final brancher compound.

The reaction formula of Preparation Example 1 is the same as the following Reaction Formula 2.

[Reaction Formula 2]

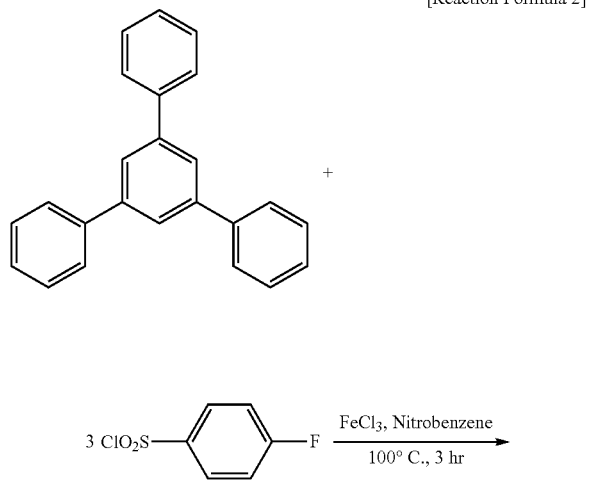

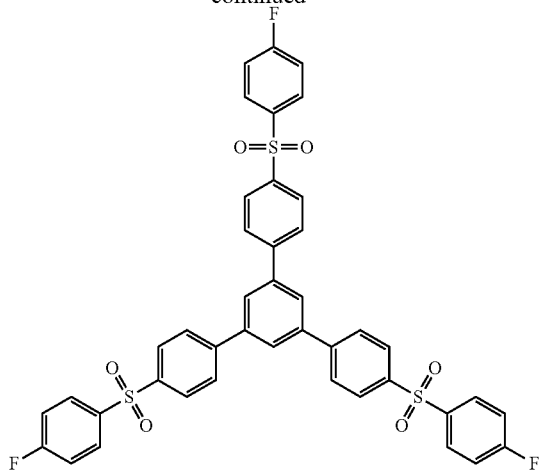

The following FIG. 2 illustrates the synthesis confirmation result of the brancher compound.

<Preparation Example 2> Manufacture of Polymer 6.5595 g (1 eq, 0.02620 mol) of 4,4'-thiobisbenzenethiol, 7.0000 g (0.583 eq, 0.01523 mol) of disodium 2,2'-disulfonate-4,4'-difluorodiphenyl sulfone, 2.6110 g (0.392 eq, 0.01027 mol) of 4,4'-difluorodiphenyl sulfone, and 0.4091 g (0.02 eq, 0.5239 mmol) of the brancher described in Reaction Formula 1 were put into a 500 mL round flask equipped with a Dean-Stark device and a condenser, and 14.4817 g (4 eq, 0.10479 mol) of potassium carbonate was used to initiate the reaction under a nitrogen atmosphere by using 83 mL of N-methyl-2-pyrrolidone (NMP) and 41.5 mL of benzene.

And then, the reaction mixture was stirred in an oil bath at a temperature of 140° C. for 4 hours, benzene was adsorbed onto molecular sieves of the Dean-Stark device while being flowed back and removed, and then the reaction temperature was increased to 175° C., and a polycondensation reaction was carried out for 6 hours.

After the reaction was completed, the temperature of the reactant was decreased to room temperature, the reactant was diluted by adding NMP thereto, and then the copolymer was separated from the solvent by pouring the diluted reactant into an excessive amount of distilled water, and then the copolymer was filtered and dried in a vacuum oven at 80° C. for a day or more, thereby manufacturing a polymer. The weight average molecular weight of the polymer was 250,000.

The reaction formula of Preparation Example 2 is the same as the following Reaction Formula 3.

[Reaction Formula 3]

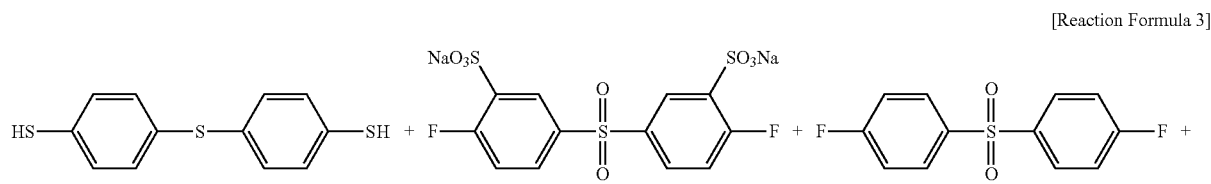

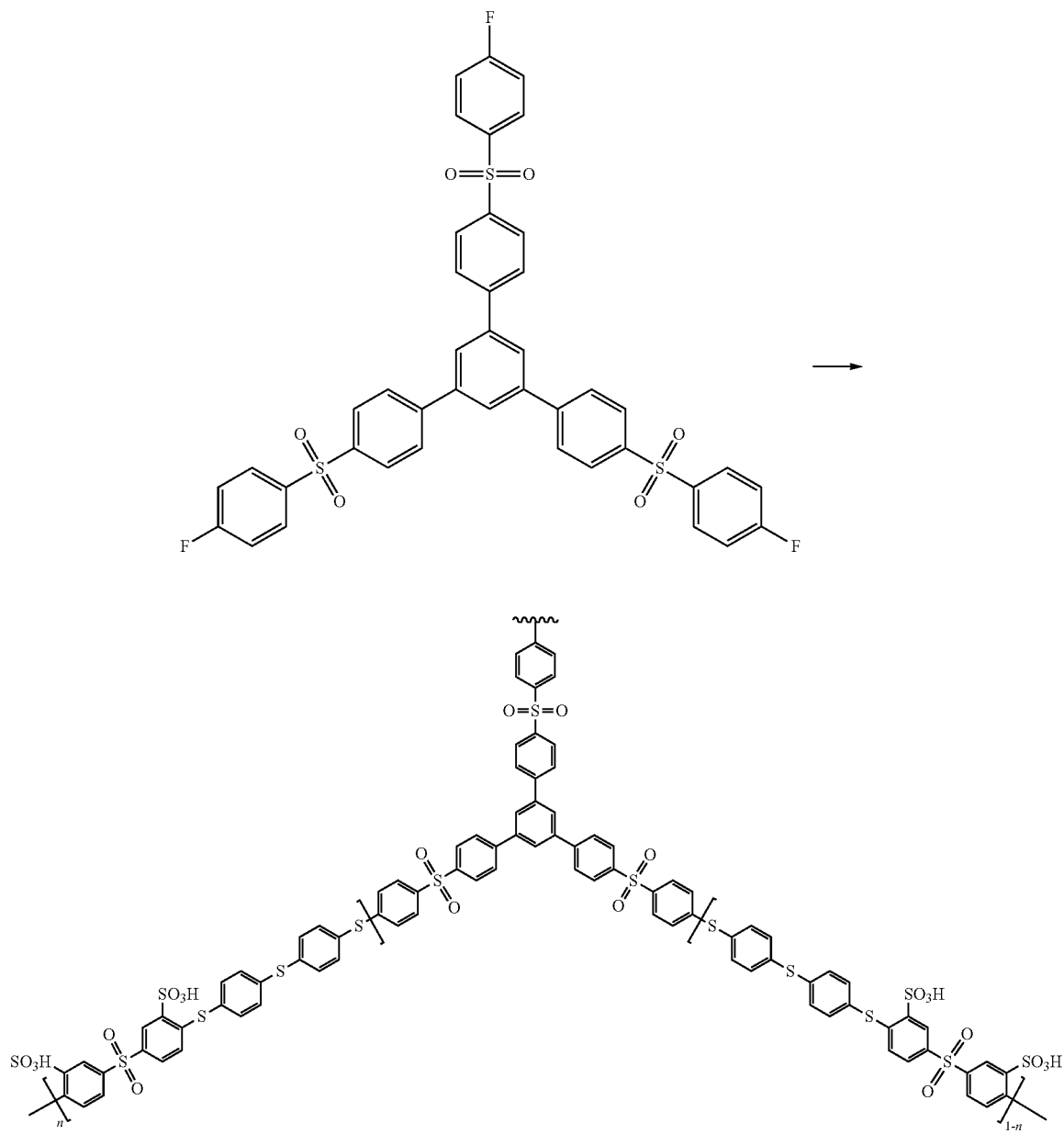

<Preparation Example 3> Manufacture of Polymer Electrolyte Membrane

The hydrogen treatment-branched, sulfonated polymer manufactured in the Example was dissolved in NMP, and then the solution was filtered with a glass filter (pore size 3) to remove dirt, and the like. The NMP in the filtrate was removed by simultaneously increasing the temperature to 120° C. while applying vacuum to 10% (w/V) of the filtrate, thereby preparing about 20% (w/V) of a solution. The solution was poured into a glass substrate, the thickness of the copolymer solution was adjusted on the glass substrate by using a film applicator, and then the copolymer solution on the glass substrate was dried in a vacuum oven at 80° C. for 12 hours or more, thereby manufacturing a polymer electrolyte membrane having a thickness of 50 to 120 μm.

<Preparation Example 4> Oxidation of Polymer Electrolyte Membrane

The polymer electrolyte membrane manufactured above was immersed in an oxidizing solution (a mixed solution of acetic acid (200 ml), sulfuric acid (5 ml), and hydrogen peroxide (5 ml)) under room temperature conditions for a day, thereby manufacturing a final poly(sulfone) electrolyte membrane.

The reaction formula of Preparation Example 4 is the same as the following Reaction Formula 4.

[Reaction Formula 4]

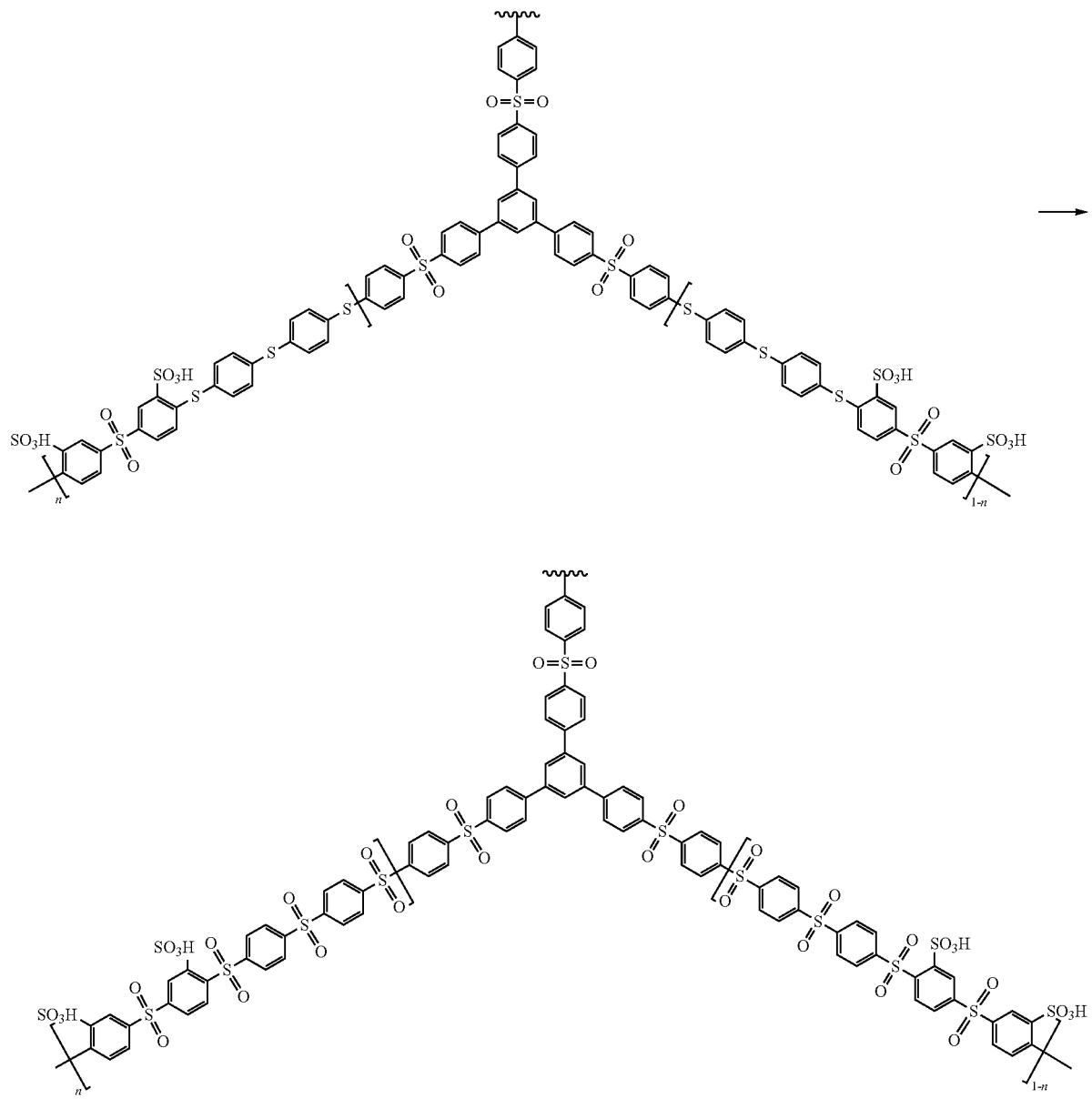

<Experimental Example 1> Evaluation of Characteristics of Electrolyte Membrane

The ion exchange capacity (IEC) and the hydrogen ion conductivity according to the relative humidity under conditions of 70° C. were measured by using the polymer electrolyte membrane manufactured in Preparation Example 4, and the measured graph is illustrated in FIG. 1.

As illustrated in FIG. 1, it can be confirmed that the polymer according to an exemplary embodiment of the present application has a higher increase rate of hydrogen conductivity according to the increase in relative humidity than that of Nafion. In particular, it can be confirmed that at a high relative humidity of 80% or more, the polymer according to an exemplary embodiment of the present application has higher hydrogen ion conductivity than that of Nafion.

Accordingly, a polymer itself according to an exemplary embodiment of the present application has chemical resistance and high mechanical properties, and an electrolyte membrane including the polymer has high ion conductivity and may have an effect in that the performance of a battery is improved.

The invention claimed is:
1. A polymer consisting of:
   a brancher represented by the following Chemical Formula 1; and
   a repeating unit represented by the following Chemical Formula A:

[Chemical Formula 1]

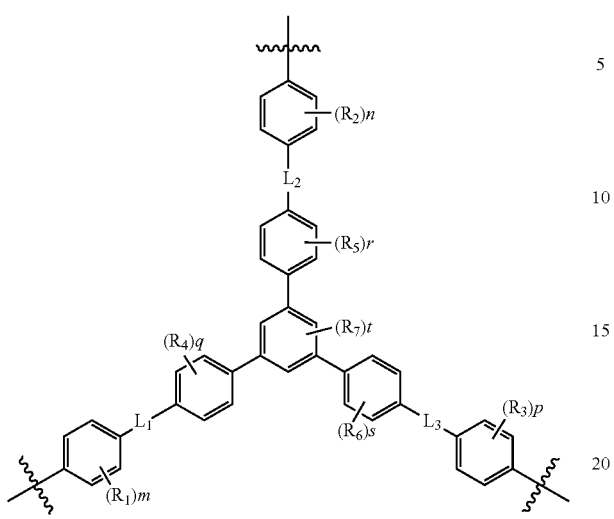

in Chemical Formula 1, $L_1$ to $L_3$ are the same as or different from each other, and are each independently a direct bond, $-SO_2-$, $-CO-$, or $-S-$, $R_1$ to $R_7$ are the same as or different from each other, and are each independently any one selected from hydrogen; deuterium; a halogen group; a nitrile group; a nitro group; a hydroxy group; a cyano group; a $C_1$ to $C_{60}$ straight or branched alkyl; a $C_2$ to $C_{60}$ straight or branched alkenyl; a $C_2$ to $C_{60}$ straight or branched alkynyl; a $C_3$ to $C_{60}$ monocyclic or polycyclic cycloalkyl; a $C_2$ to $C_{60}$ monocyclic or polycyclic heterocycloalkyl; a $C_6$ to $C_{60}$ monocyclic or polycyclic aryl; a $C_2$ to $C_{60}$ monocyclic or polycyclic heteroaryl; and an amine group, and the substituents are optionally unsubstituted or substituted with halogen, m, n, p, q, r, and s are the same as or different from each other, and are each independently an integer from 0 to 4, t is an integer from 0 to 3, when m, n, p, q, r, s, and t are each an integer of 2 or more, a plurality of $R_1$ to $R_7$ are the same as or different from each other,

[Chemical Formula A]

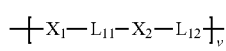

in Chemical Formula A, v means the number of repeating units, and is an integer from 1 to 1,000, $L_{11}$ and $L_{12}$ are $-SO_2-$, $X_1$ and $X_2$ are Chemical Formula 2,

[Chemical Formula 2]

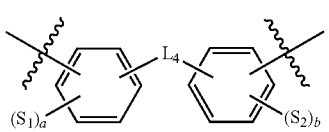

in Chemical Formula 2, $L_4$ is any one selected from a direct bond, $-CZ_2Z_3-$, $-CO-$, $-O-$, $-S-$, $-SO_2-$, $-SiZ_2Z_3-$, and a substituted or unsubstituted divalent fluorene group, $Z_2$ and $Z_3$ are the same as or different from each other, and are each independently any one selected from hydrogen, an alkyl group, a trifluoromethyl group ($-CF_3$), and a phenyl group, $S_1$ to $S_2$ are the same as or different from each other, and are each independently any one selected from hydrogen; deuterium; a halogen group; a cyano group; a nitrile group; a nitro group; a hydroxy group; a substituted or unsubstituted alkyl group; a substituted or unsubstituted heterocycloalkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; a substituted or unsubstituted heteroaryl group; $-SO_3H$; $-SOO_3^-M^+$; $-COOH$; $-COO^-M^+$; $-PO_3H_2$; $-PO_3H^-M^+$; and $-PO_3^{2-}2M^+$, and M is a Group 1 element, a to b are the same as or different from each other, and are each independently an integer of 0 or more and 4 or less.

2. The polymer of claim 1, wherein $R_1$ to $R_7$ are the same as or different from each other, and are each independently any one selected from hydrogen; deuterium; a halogen group; a $C_1$ to $C_{10}$ alkyl group; and $-(CF_2)uCF_3$, and u is an integer from 0 to 5.

3. The polymer of claim 1, wherein m, n, and p are the same as or different from each other, and are each independently 0 or 1.

4. The polymer of claim 1, wherein q, r, s, and t are 0.

5. The polymer of claim 1, wherein $L_1$ to $L_3$ are the same as or different from each other, and are each independently $-S-$ or $-SO_2-$.

6. The polymer of claim 1, wherein $L_1$ to $L_3$ are $-SO_2-$.

7. The polymer of claim 1, wherein a content of the brancher represented by Chemical Formula 1 is 0.5 to 50 wt % based on the polymer solid content.

8. The polymer of claim 1, wherein the polymer has a weight average molecular weight of 5,000 to 5,000,000.

9. An electrolyte membrane comprising the polymer of claim 1.

10. The electrolyte membrane of claim 9, wherein the electrolyte membrane has a thickness of 5 to 200 μm.

11. A battery comprising the electrolyte membrane of claim 9.

12. A method for manufacturing a polymer according to claim 1, the method comprising:

a) manufacturing a brancher represented by the following Chemical Formula 1-A by reacting 1,3,5-triphenylbenzene and a dihalogen-based phenyl; and b) manufacturing a polymer by polymerizing the brancher and at least one of monomers represented by the following Chemical Formula 2-A:

[Chemical Formula 1-A]

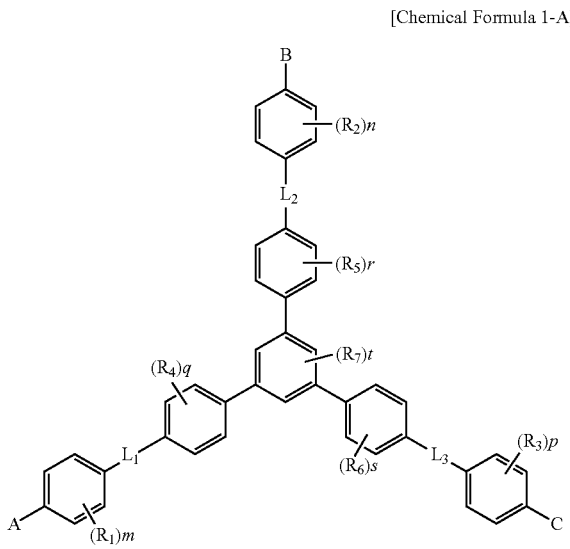

in Chemical Formula 1-A,

A to C are each a halogen group, $L_1$ to $L_3$ are the same as or different from each other, and are each independently a direct bond, —$SO_2$—, —CO—, or —S—, $R_1$ to $R_7$ are the same as or different from each other, and are each independently any one selected from hydrogen; deuterium; a halogen group; a nitrile group; a nitro group; a hydroxy group; a cyano group; a $C_1$ to $C_{60}$ straight or branched alkyl; a $C_2$ to $C_{60}$ straight or branched alkenyl; a $C_2$ to $C_{60}$ straight or branched alkynyl; a $C_3$ to $C_{60}$ monocyclic or polycyclic cycloalkyl; a $C_2$ to $C_{60}$ monocyclic or polycyclic heterocycloalkyl; a $C_6$ to $C_{60}$ monocyclic or polycyclic aryl; a $C_2$ to $C_{60}$ monocyclic or polycyclic heteroaryl; and an amine group, and the substituents are optionally unsubstituted or substituted with halogen, m, n, p, q, r, and s are the same as or different from each other, and are each independently an integer from 0 to 4, t is an integer from 0 to 3, when m, n, p, q, r, s, and t are each an integer of 2 or more, a plurality of $R_1$ to $R_7$ are the same as or different from each other,

[Chemical Formula 2-A]

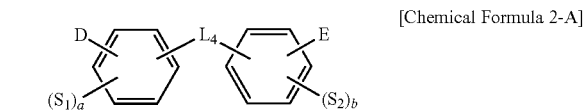

in Chemical Chemical Formula 2-A,

D to E are —SH, $L_4$ is any one selected from a direct bond, —$CZ_2Z_3$—, —CO—, —O—, —S—, —$SO_2$—, —$SiZ_2Z_3$—, and a substituted or unsubstituted divalent fluorene group, $Z_2$ and $Z_3$ are the same as or different from each other, and are each independently any one selected from hydrogen, an alkyl group, a trifluoromethyl group (—$CF_3$), and a phenyl group, $S_1$ to $S_2$ are the same as or different from each other, and are each independently any one selected from hydrogen; deuterium; a halogen group; a cyano group; a nitrile group; a nitro group; a hydroxy group; a substituted or unsubstituted alkyl group; a substituted or unsubstituted heterocycloalkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; a substituted or unsubstituted heteroaryl group; —$SO_3H$; —$SOO_3^-M^+$; —COOH; —$COO^-M^+$; —$PO_3H_2$; —$PO_3H^-M^+$; and —$PO_3^{2-}2M^+$, and M is a Group 1 element, a to b are the same as or different from each other, and are each independently an integer of 0 or more and 4 or less, wherein the polymer comprises an —S— linking group, and the method further includes oxidizing at least a portion of the —S— linking group by —$SO_2$—.

13. The method of claim 12, wherein the oxidation is carried out by using an oxidizing solution.

14. A method for manufacturing an electrolyte membrane, the method comprising:

manufacturing a polymer according to the method of claim 12; and forming a membrane by using the manufactured polymer.

15. The method of claim 14, wherein the method comprises oxidizing at least a portion of an —S— linking group in the polymer by —$SO_2$— before or after the forming of the membrane.

\* \* \* \* \*